United States Patent
Appiah et al.

(10) Patent No.: US 9,319,511 B2
(45) Date of Patent: *Apr. 19, 2016

(54) MANAGEMENT AND DIAGNOSIS OF TELEPHONIC DEVICES

(71) Applicant: Microsoft Technology Licensing, LLC, Redmond, WA (US)

(72) Inventors: Madan Mohan R. Appiah, Redmond, WA (US); Subramanian Chandrasekaran, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/681,303

(22) Filed: Apr. 8, 2015

(65) Prior Publication Data

US 2015/0215448 A1 Jul. 30, 2015

Related U.S. Application Data

(63) Continuation of application No. 11/768,809, filed on Jun. 26, 2007, now Pat. No. 9,032,079.

(51) Int. Cl.
*H04M 3/28* (2006.01)
*H04M 3/08* (2006.01)
(Continued)

(52) U.S. Cl.
CPC ........ *H04M 3/28* (2013.01); *H04M 3/08* (2013.01); *H04M 3/22* (2013.01); *H04M 3/42178* (2013.01); *H04M 2203/052* (2013.01)

(58) Field of Classification Search
USPC ........................................ 709/224–229, 247
See application file for complete search history.

(56) References Cited

U.S. PATENT DOCUMENTS

| 5,491,791 A | 2/1996 | Glowny et al. |
| 6,219,708 B1 | 4/2001 | Martenson |
| 6,353,902 B1 | 3/2002 | Kulatunge et al. |

(Continued)

OTHER PUBLICATIONS

Waheed et al., "An Infrastructure for Monitoring and Management in Computational Grids", Selected Papers from the 5th International Workshop on Languages, Compilers, and Run-Time Systems for Scalable Computers, Year of Publication: 2000, 11 pages.

(Continued)

*Primary Examiner* — Backhean Tiv
(74) *Attorney, Agent, or Firm* — Andrew Smith; Doug Barker; Micky Minhas

(57) ABSTRACT

Systems and methods of managing and diagnosing enterprise telephonic devices are disclosed. A provisioning request can be received from an enterprise telephonic device. The provisioning request can include a domain name system lookup request. An enterprise network address of a device management server can be provided to the enterprise telephonic device. A voice data link can be established with the enterprise telephonic device so as to permit the enterprise telephonic device to communicate over a data network with endpoint telephonic devices. The device management server can periodically receive heartbeat data from the enterprise telephonic device. The heartbeat can be indicative of a status of at least one functionality of the enterprise telephonic device. The enterprise telephonic device can provide diagnostic logs when requested by the device management server. In addition, the enterprise telephonic device can be configured to periodically request software updates.

20 Claims, 6 Drawing Sheets

(51) Int. Cl.
*H04M 3/22* (2006.01)
*H04M 3/42* (2006.01)

(56) References Cited

U.S. PATENT DOCUMENTS

| | | | |
|---|---|---|---|
| 6,480,901 B1 | 11/2002 | Weber et al. | |
| 6,505,248 B1 | 1/2003 | Casper et al. | |
| 6,639,983 B1 | 10/2003 | Kielty, Jr. et al. | |
| 6,823,373 B1* | 11/2004 | Pancha | H04L 67/2819 707/999.104 |
| 7,089,259 B1 | 8/2006 | Kouznetsov et al. | |
| 7,117,239 B1 | 10/2006 | Hansen | |
| 7,149,928 B2 | 12/2006 | van Os | |
| 7,184,418 B1* | 2/2007 | Baba | H04L 12/2602 370/331 |
| 7,366,460 B2* | 4/2008 | O'Farrell | G06Q 10/10 455/3.06 |
| 7,472,352 B2* | 12/2008 | Liversidge | G06Q 10/10 715/751 |
| 7,567,504 B2* | 7/2009 | Darling | H04L 29/06 370/216 |
| 7,590,736 B2* | 9/2009 | Hydrie | H04L 29/06 709/226 |
| 7,613,822 B2* | 11/2009 | Joy | H04L 29/06 709/227 |
| 7,636,917 B2* | 12/2009 | Darling | H04L 29/06 709/223 |
| 7,676,570 B2* | 3/2010 | Levy | H04L 43/0852 709/224 |
| 7,945,036 B1 | 5/2011 | Tonogai et al. | |
| 7,970,765 B1* | 6/2011 | Olsen | H04L 12/4679 707/737 |
| 7,971,250 B2* | 6/2011 | Walter | H04L 63/145 726/22 |
| 8,082,552 B2* | 12/2011 | Agrawal | H04L 12/581 455/418 |
| 8,166,182 B2* | 4/2012 | Crouch | G06Q 40/04 705/37 |
| 8,555,273 B1* | 10/2013 | Chia | G06F 8/665 717/168 |
| 2001/0033565 A1 | 10/2001 | Rogers | |
| 2002/0169867 A1* | 11/2002 | Mann | H04L 41/0213 709/224 |
| 2002/0198937 A1* | 12/2002 | Diwan | G06F 17/30899 709/203 |
| 2003/0217146 A1 | 11/2003 | Srivastava et al. | |
| 2004/0229654 A1* | 11/2004 | Farcasiu | G06Q 10/10 455/566 |
| 2004/0267708 A1 | 12/2004 | Rothman et al. | |
| 2005/0055435 A1* | 3/2005 | Gbadegesin | H04L 29/06 709/224 |
| 2005/0102567 A1 | 5/2005 | McGuire et al. | |
| 2005/0172141 A1* | 8/2005 | Gayde | H04L 29/06027 713/191 |
| 2005/0283764 A1* | 12/2005 | Chiu | G06F 11/327 717/125 |
| 2006/0073785 A1* | 4/2006 | Klassen | H04L 67/02 455/3.01 |
| 2006/0106806 A1* | 5/2006 | Sperling | G06F 8/65 |
| 2006/0121923 A1* | 6/2006 | East | H04M 3/42374 455/518 |
| 2006/0256012 A1 | 11/2006 | Fok et al. | |
| 2007/0183363 A1* | 8/2007 | Liden | H04L 29/12066 370/331 |
| 2007/0217434 A1 | 9/2007 | Welbourn | |
| 2008/0040452 A1* | 2/2008 | Rao | H04L 1/243 709/219 |
| 2008/0049623 A1 | 2/2008 | Qiu et al. | |
| 2008/0086370 A1* | 4/2008 | Narayanaswami | G06F 3/1415 705/14.73 |
| 2008/0154805 A1* | 6/2008 | Gurumoorthy | G06F 9/505 706/12 |

OTHER PUBLICATIONS

Hong et al., "A Hybrid Architecture for Remote Monitoring and Diagnosis of Large Complex Systems", Year of publication: 2002, pp. 1-8.

\* cited by examiner

MANAGEMENT AND DIAGNOSIS OF TELEPHONIC DEVICES

CROSS-REFERENCE TO RELATED APPLICATIONS

The present applications is a continuation of and claims priority to U.S. patent application Ser. No. 11/768,809, entitled "Management and Diagnosis of Telephonic Devices" filed Jun. 26, 2007, the entirety of which is incorporated herein by reference.

BACKGROUND

Communication devices are becoming more pervasive and widely used. Business entities utilize multiple telephone devices that are connected to the infrastructure of the business and require maintenance. Maintenance of telephonic devices in businesses and enterprises generally entail an office visit by technical personnel to serve the telephonic device. Office visits and manual servicing and maintenance of telephonic devices become impractical as the number of telephones increase. In addition, in a large enterprise with hundreds of telephones, costs of manually installing and servicing telephonic devices can become an important budget concern.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one aspect, a method of remotely provisioning one or more enterprise telephonic device is disclosed. The enterprise telephonic device can be a non-provisioned telephonic device. The enterprise telephonic device can be configured to submit a self-provisioning request to the enterprise infrastructure. An enterprise network address of a device management server can be provided to the enterprise telephonic device. Remote management, diagnosis and updating of the enterprise telephonic device can be performed by an enterprise administrator that connects to the device management server via a console or other user interface. The enterprise telephonic device can provide heartbeat data and event data to the device management server. The system administrator can review the heartbeat data, event data, and any other diagnostic data sent to the device management server. The administrator can further request additional diagnostic logs from the enterprise telephonic device. Data received from the enterprise telephonic device can be store by a centralized storage server, such as a share point server.

The device can also be configured to check for software updates. Software updates can be requested from an update service. Such update service can be a web service, or any other type of remote software provider.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Methods and systems for managing self-provisioned enterprise telephonic devices are disclosed herein. The systems and methods disclosed permit the self-provisioning and remote management of telephonic devices in an enterprise network. In one aspect, telephonic devices can be non-provisioned telephonic devices that request to be added to an enterprise network. The enterprise network does not have to have previous data associated with the non-provisioned telephonic device. As such, non-provisioned enterprise telephonic devices can be configured with software to determine the network to which the enterprise telephonic device should connect. For example, the enterprise telephonic device can submit a domain name system request, and further submit a self-provisioning request.

Once provisioned as part of the enterprise network the enterprise telephonic devices can be managed and updated by an enterprise network administrator. A device management server can be configured to permit an enterprise administrator to manage one or more enterprise telephonic devices. Furthermore, a share point server can permit the enterprise administrator to store diagnostic data submitted by the enterprise telephonic device, update software, and any other data that the enterprise administrator requires in order to manage the enterprise telephonic devices.

As used herein, a telephonic device is any device that allows a user to communicate with another telephonic device using speech. As such, a telephonic device can be configured to relay voice messages to another telephonic device via a communications network. The communications network utilized by the telephonic device can be a cellular network, a public switched network, an Internet network, or any other network and/or combinations thereof.

Accordingly, although the present examples are described and illustrated herein as being implemented in a particular computer infrastructure, the system described is provided as an example and not a limitation. As those skilled in the art will appreciate, the present examples are suitable for application in a variety of different types of computer infrastructures.

Figure 1:
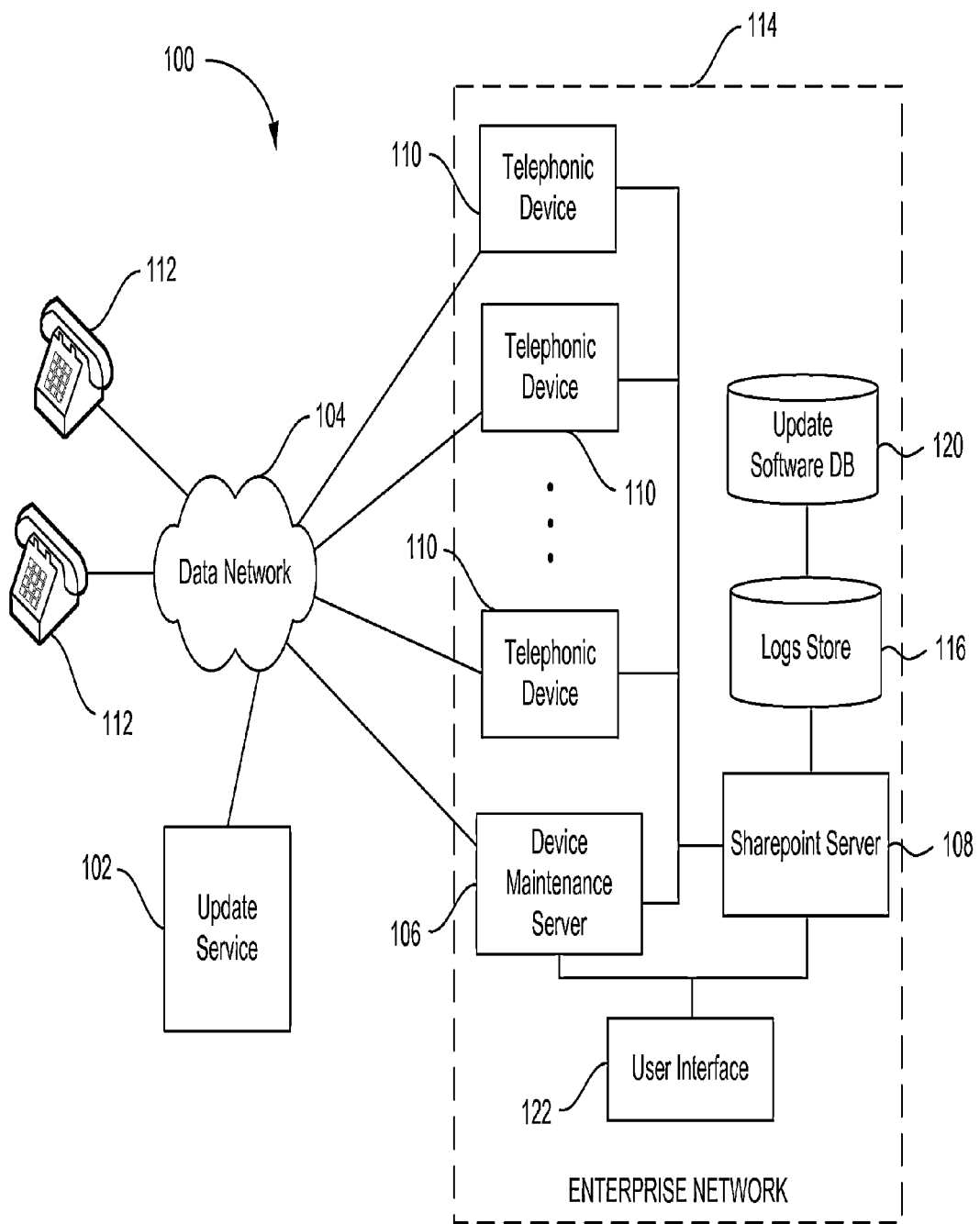
FIG. 1 illustrates a component diagram of a system for managing and diagnosing telephonic devices according to one embodiment.

FIG. 1 illustrates a component diagram of a system for managing and diagnosing telephonic devices according to one embodiment. An enterprise network 114 can be an intranet or other computer network infrastructure administered by a business entity such as a company or corporation. The enterprise network 114 can also include enterprise telephonic devices 110. Examples of enterprise telephonic devices 110 include conventional telephones, conference telephones or roundtable telephones, personal computers configured to establish a telephonic connection, and the like. The enterprise telephonic devices 110 can be configured to communicate with any endpoint telephonic device 112 via a data network 104. Therefore, enterprise telephonic devices 110 can be equipped to handle Internet telephone calls (e.g., voice over Internet protocol), or any other type of data telephone call.

In one embodiment, the data network 104 can be an intranet. In another embodiment, the data network 104 can be the Internet. In another embodiment, the data network 104 can be partially a packet switched network. Thus, for example, the data network 104 can include a public switched network that interfaces with a packet switched network in order to conduct a telephone call between any enterprise telephonic device 110 and any endpoint telephonic device 112. Like enterprise telephonic device 110, endpoint telephonic devices 112 can include conventional telephones, conference telephones or roundtable telephones, personal computers configured to establish a telephonic connection, and the like.

The enterprise network 114 can also include a device management server 106. The device management server 106 can be a central server that permits the management of one or more enterprise telephonic devices. Furthermore, the device management server 106 can interact with a user interface module 122. An administrator of the enterprise network 114 can utilize the user interface module 122 to access and control the device management server 106. As such, the device management server 106 can permit an administrator to control the data flow to and from the enterprise telephonic device in order to provision, diagnose and update the enterprise telephonic device.

In one embodiment, the device management server 106 is configured to allow the provisioning of the enterprise telephonic devices 110. Enterprise telephonic devices 110 can submit provisioning requests to the device management server 106 and automatically register as an element of the enterprise network 114. Thus, instead of originating the provisioning of the enterprise telephonic device at the device management server 106, the provisioning of the enterprise telephonic device occurs based on a request from the enterprise telephonic device. As such, each enterprise telephonic device 110 is effectively self-provisioned. This approach increases scalability of the enterprise network 114 because enterprise telephonic devices 110 can be provisioned efficiently without the need of an administrator manually provisioning the telephonic device.

For example, the enterprise telephonic device can submit a request for self-provisioning including a domain name system lookup request. The domain name system lookup request can include a service record that requests authentication by the device management server 106. Upon authenticating the enterprise telephonic device, the device management server 106 can provide an enterprise network address to the enterprise telephonic device 110. The network address can permit the enterprise telephonic device 110 to communicate with the device management server 106. The enterprise network address can be, for example, and IP address. The device management server 106 can be further configured to dynamically provide an IP address to the enterprise telephonic device 110 so that the enterprise telephonic device can send and receive voice data via a data network 104.

In another embodiment, the device management server 106 can be configured to facilitate the diagnosing of enterprise telephonic devices. The device management server 106 can receive heartbeat data and event data from an enterprise telephonic device 110. In one example, the event data is associated with an occurrence of an event.

In another example, the device management server 106 receives from the enterprise telephonic devices 110 device information, health status and diagnostic information to the device management server 106. In one embodiment, diagnostic logs are periodically received at the device management server 106. In another embodiment, diagnostic logs are received at the device management server 106 on demand.

The device information and device health status can help enterprise infrastructure administrators to manage the enterprise telephonic devices 110 and report solution status. Critical event information and diagnostic log information can help the enterprise infrastructure administrators to resolve user problems.

The device management server 106 can be configured to collect and store diagnostic data and event data in the logs store 116. In one example enterprise telephonic device inventories can be stored. Enterprise telephonic device inventories can include the number of enterprise telephonic devices being deployed, number of device types being deployed, operating systems version deployed in each enterprise telephonic device, applications deployed to each enterprise telephonic device, number of active enterprise telephonic devices, updated enterprise telephonic devices, and the like.

In another example, enterprise telephonic devices' health can be collected and stored by the device management server 106. Enterprise telephonic devices' health data can include operating system and/or application version running on each enterprise telephonic device, device heartbeat health, device activities such as number of reboots caused by software faults and power, debug information including call and execution logs, number of update attempts, last successful update, and the like.

Furthermore, in another example, enterprise telephonic device diagnostic data such as critical event information, software log files, crash dumps, and others can also be collected.

The device management server 106 can be configured to analyze the heartbeat and the event data received from the enterprise telephonic devices 110 to determine whether there is a voice communication malfunction in the enterprise telephonic device 110. For example, a voice communication malfunction can be a failure to transmit voice data to endpoint telephonic devices 112. In another embodiment, the event data received can be analyzed to simply audit the correct functioning of a particular enterprise telephonic device.

Furthermore, diagnostic logs can be collected from enterprise telephonic devices on demand. As such, the device management server 106 can be configured to request enterprise telephonic device diagnostic logs showing occurred events, etc. In one example, the diagnostic logs can be requested by an administrator via the user interface 122. In addition, the device management server 106 can be configured to retrieve or store any diagnostic log information in the logs store 116.

Diagnostic logs can be stored in the logs store 116 in order to allow the analysis of the diagnostic logs by a third party such as an update service 102. Upon reviewing the diagnostic logs, the update service 102 can determine what type of software update a particular telephonic device 110 may require. In one embodiment, the diagnostic logs can be collected and reviewed by enterprise infrastructure administrators before the diagnostic logs are sent to an update service 102. The enterprise infrastructure administrators can filter private data before the diagnostic logs are sent to the update service 102 for troubleshooting. For example, demographic information of users of the enterprise telephonic devices can be removed. In another example, calling history such as called telephone numbers, times of calls, or other sensitive information can be removed.

In another embodiment, the device management server 106 can be configured to facilitate the updating of enterprise telephonic devices. For instance, the device management server 106 can be configured to download software updates from the update service 102 using a pull mechanism. As such, the device management server 106 can identify software update files ready to be downloaded from the update service 102.

The device management server 106 can be configured to receive a request from the enterprise telephonic device to determine whether a software update is available. In one embodiment, the device management server 106 accesses the update software database 120 in order to determine whether a software update is available to the enterprise telephonic device 110. In another embodiment, the device management server 106 can be configured to request from the update service 102 an indication as to whether an update service software is available for downloading. The update service 102 can be a third party software provider. The device management server 106 can communicate via the data network 104 with the update service 102. In another embodiment, the device management server 106 can communicate with the device management server 106 directly.

If the update service 102 provides the indication that update service software is available, the device management server 106 can request the update service software from the update service 102. In addition, if the enterprise telephonic device 110 has not received the update service software previously, the device management server 106 can be configured to provide to the enterprise telephonic device an indication that a software update is available.

In one embodiment, once the device management server 106 requests the update service software from the update service 102, the device management server 106 stores the update service software in the update software database 120. The update software database 120 can then be accessed in the future in order to update enterprise telephonic devices 110.

In some embodiments, the device management server 106 does not communicate directly with the logs store 116 and/or the updates software database 120. Rather, the device management server 106 communicates with a share point server 106 which is configured to provide diagnostic logs, update software information, and any other data stored in the logs store 116 and/or the update software server 116. This configuration permits greater scalability since multiple device management servers can communicate with the share point server 108 in order to request data and provide data for storage. Thus, the share point server 108 can be configured to store and retrieve all data from the update software database 120 and the logs store 116. In a further embodiment, the data can be organized so that enterprise infrastructure administrators can access the data directly via the share point server 108. For example, an administrator can connect via the user interface module 122 with the share point server 108 and access data stored therein.

One skilled in the art will recognize that the logs store 116 and/or the updates software database 120 can be combined into one or more data repositories, and be located either locally or remotely. In addition, each of the aforementioned databases can be any type of data repository configured to store data and can be implemented using any methods of storage now known or to become known. Likewise, while various modules have described herein, one skilled in the art will recognize that each of the aforementioned modules can be combined into one or more modules, and be located either locally or remotely. Each of these modules can exist as a component of a computer program or process, or be standalone computer programs or processes recorded in a data repository.

Figure 2:
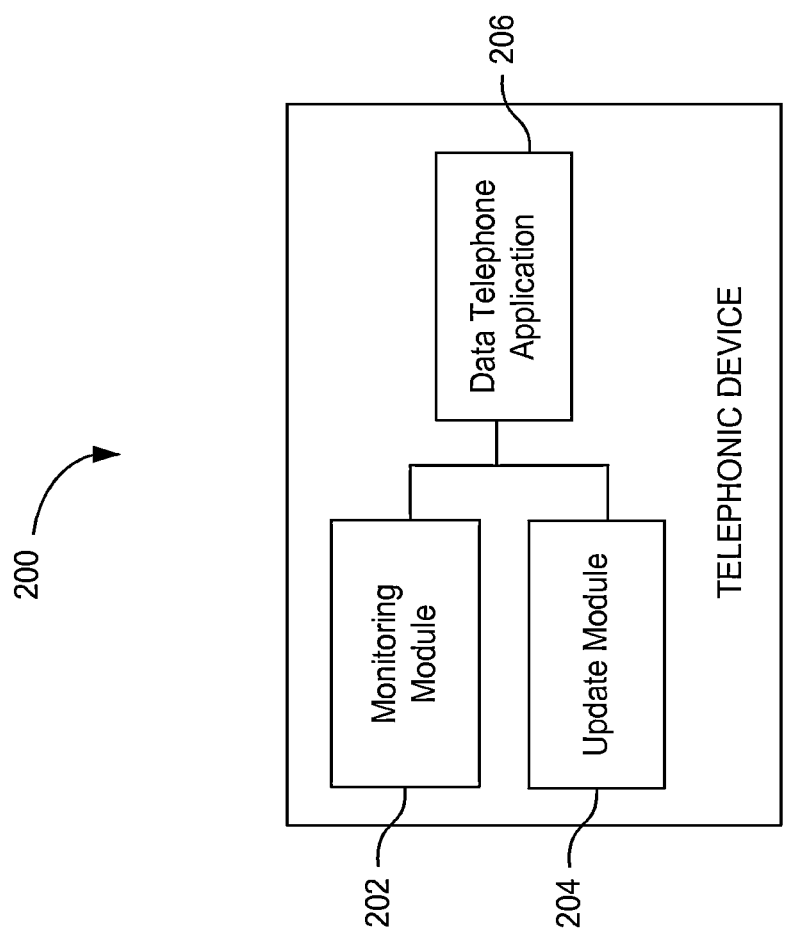
FIG. 2 illustrates a component diagram of a telephonic device according to one embodiment.

FIG. 2 illustrates a component diagram of an enterprise telephonic device according to one embodiment. Enterprise telephonic device 200 can be a conventional telephone, conference telephone or roundtable telephone, and the like. The enterprise telephonic device 200 can include a monitoring module 202, a data telephone application 206 and an update module 204. The monitoring module 202 can be configured to send device information, health status and diagnostic information to the device management server 106. In one embodiment, diagnostic logs are sent to the device management server 106 periodically. In another embodiment, diagnostic logs are sent to the device management server 106 on demand.

Data telephone application 206 is generically any application that enables a device to permit voice communication over data channels with other voice devices. In one example, the data telephone application 206 permits communication over a packet switched network (e.g., IP network). The enterprise telephonic device 200 can periodically contact the device management server 106 to check for any software updates of the data telephone application 206. The data telephone application 206 can be an embedded application that runs SIP (Session Initiation Protocol) based IP phone software to establish communication with endpoint telephonic devices 112.

In one embodiment, the update module 204 can be configured to download software updates from the device management server 106 using a pull mechanism. For example, the update module 204 can identify software update files ready to be downloaded from the device management server 106. In another example, the update module 204 can be configured to download software updates from the update software database 120 by communicating directly with the share point server 108.

Figure 3:
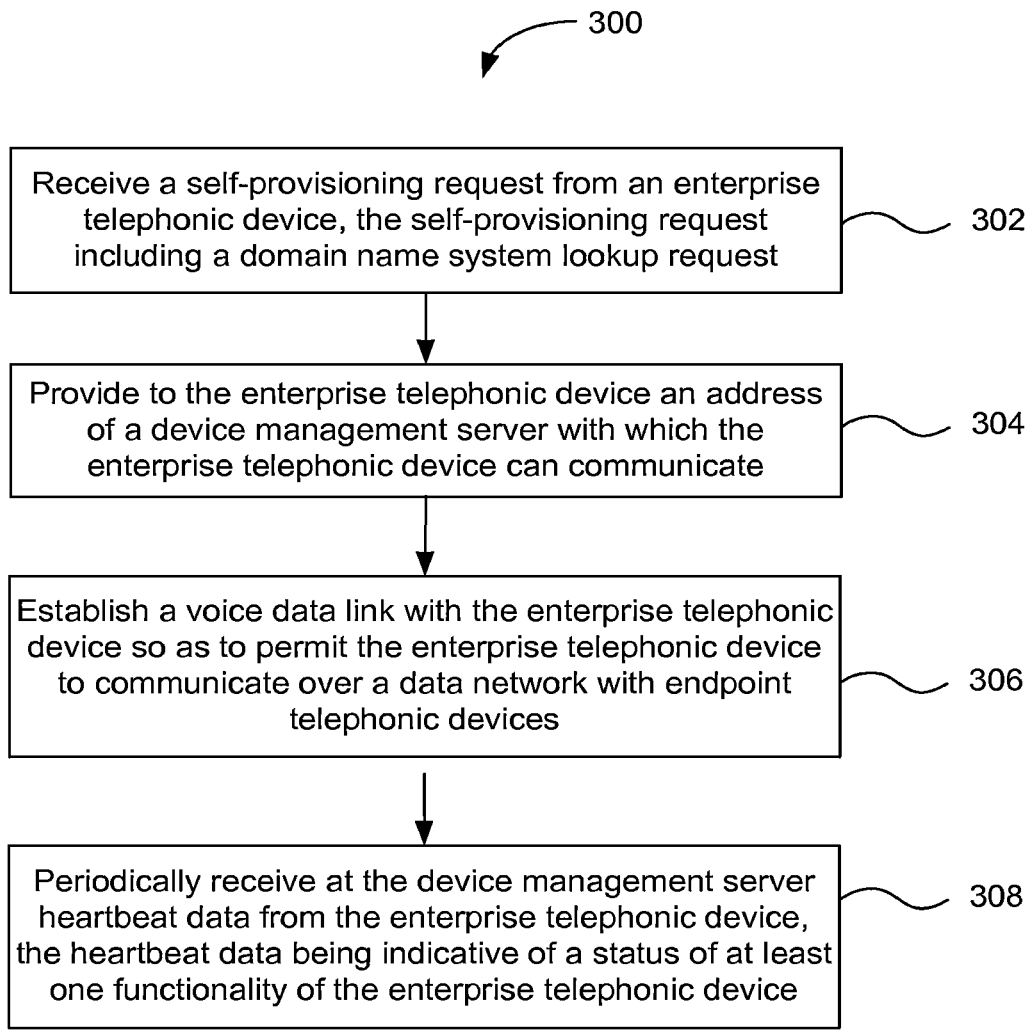
FIG. 3 illustrates a flow diagram of a process for managing self-provisioned enterprise telephonic devices as part of an enterprise infrastructure according to one embodiment.

FIG. 3 illustrates a flow diagram of a process for managing self-provisioned enterprise telephonic devices as part of an enterprise infrastructure according to one embodiment. At process block 302, a self-provisioning request can be received from an enterprise telephonic device. The self-provisioning request can be a message sent from the enterprise telephonic device 110 to the device management server 106 in order to provision itself and become an additional telephonic device in the enterprise infrastructure. In one embodiment, the self-provisioning request can include a domain name system lookup request. Furthermore, the domain name system lookup request can include a service record (e.g., SRV DNS record) that requests authentication by the device management server. An IP address can be dynamically provided to the enterprise telephonic device so that the device can send and receive voice data via a data network. Process 300 continues at process block 304.

At process block 304, the enterprise telephonic device can be provided with an enterprise network address of a device management server with which the enterprise telephonic device can communicate. Process 300 continues at process block 306.

At process block 306, a voice data link is established with the enterprise telephonic device so as to permit the enterprise telephonic device to communicate over a data network with endpoint telephonic devices. Process 300 continues at process block 308. At process block 308, the device management server periodically receives heartbeat data from the enterprise telephonic device. The heartbeat data can be indicative of a status of at least one functionality of the enterprise telephonic device.

Figure 4:
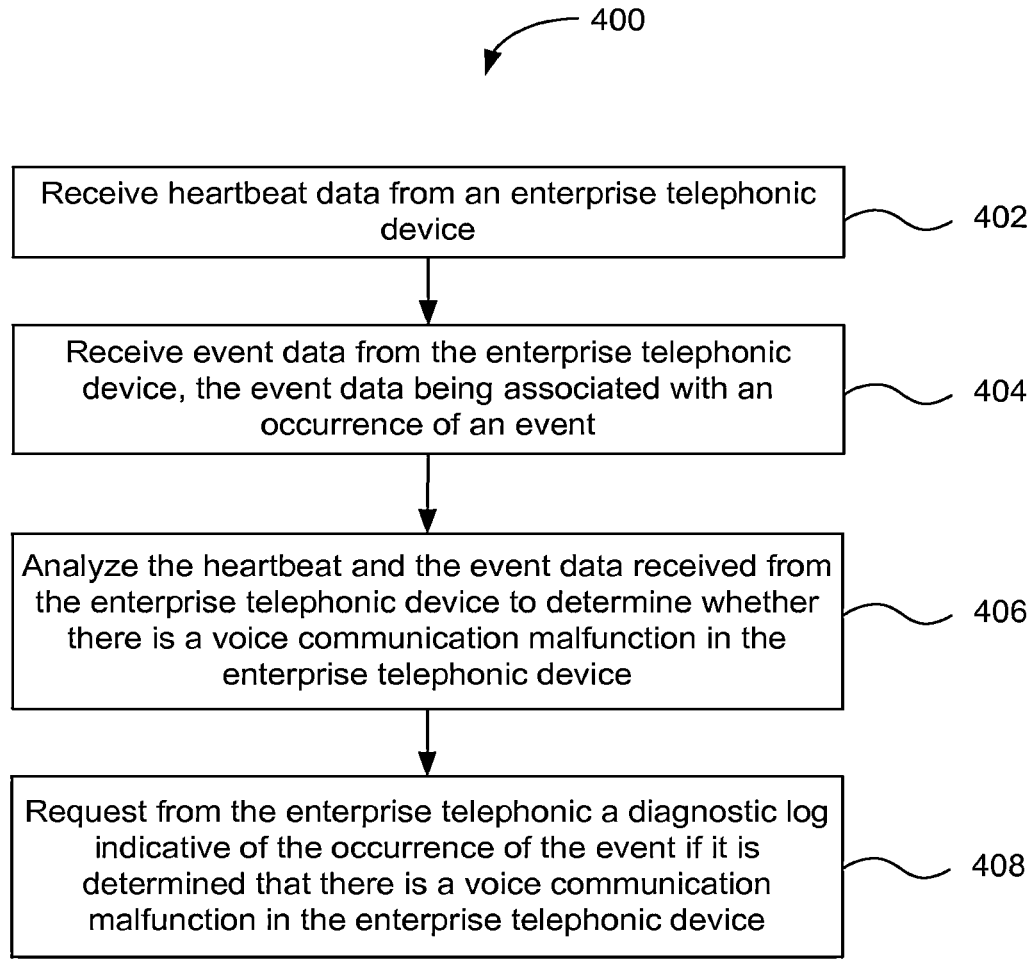
FIG. 4 illustrates a flow diagram of a process for diagnosing a self-provisioned enterprise telephonic device according to one embodiment.

FIG. 4 illustrates a flow diagram of a process for diagnosing a self-provisioned enterprise telephonic device according to one embodiment. At process block 402, heartbeat data can be received from an enterprise telephonic device. Process 400 continues at process block 404. At process block 404, event data can be received from the enterprise telephonic device. The event data can be associated with an occurrence of an event. Process 400 continues at process block 406.

At process block 406, the heartbeat and the event data received from the enterprise telephonic device can be analyzed to determine whether there is a voice communication malfunction in the enterprise telephonic device. Process 400 continues at process block 408. At process block 408, if it is determined that there is a voice communication malfunction in the enterprise telephonic device, a diagnostic log indicative of the occurrence of the event can be requested from the enterprise telephonic device 110.

Figure 5:
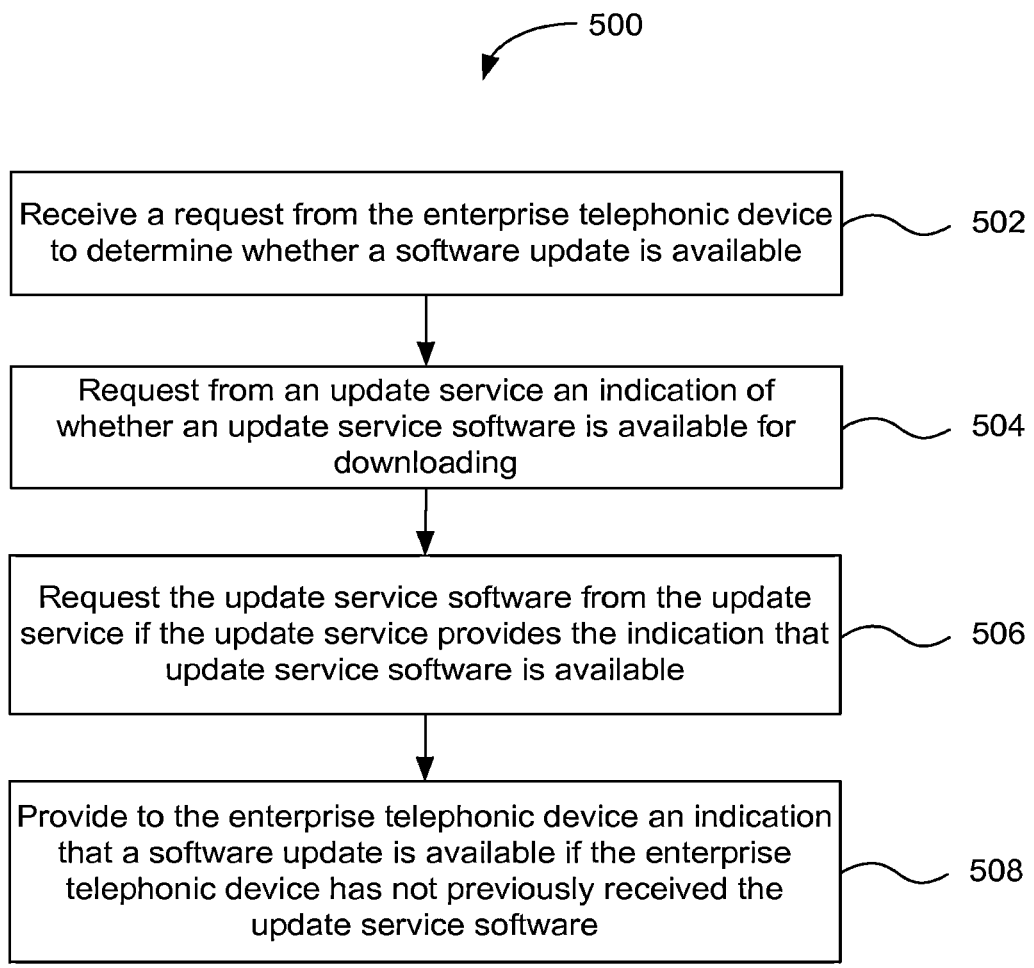
FIG. 5 illustrates a flow diagram of a process for updating a self-provisioned enterprise telephonic device according to one embodiment.

FIG. 5 illustrates a flow diagram of a process for updating a self-provisioned enterprise telephonic device according to one embodiment. At process block 502, a request from the enterprise telephonic device to determine whether a software update is available can be received at the device management server 106. Process 500 continues at process block 504. At process block 504, requesting from the update service 102 an indication of whether an update service software is available for downloading. Process 500 continues at process block 506.

At process block 506, if the update service provides the indication that update service software is available, the update service software is requested from the update service. Process 500 continues at process block 508. At process block 508, if the enterprise telephonic device has not received the update service software previously, an indication that a software update is available is provided to the enterprise telephonic device. Process 500 continues at process block 510.

Figure 6:
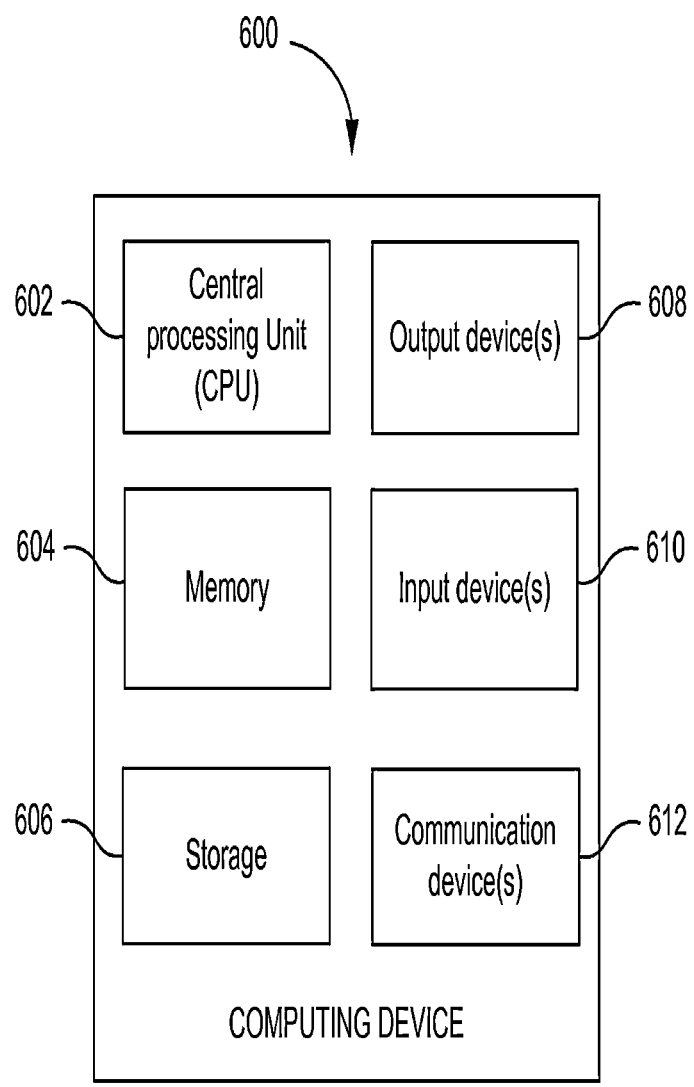
FIG. 6 illustrates a component diagram of a computing device according to one embodiment.

FIG. 6 illustrates a component diagram of a computing device according to one embodiment. The computing device 600 can be utilized to implement one or more computing devices, computer processes, or software modules described herein. In one example, the computing device 600 can be utilized to process calculations, execute instructions, receive and transmit digital signals, as required by the deployment control system 102, and/or target computing devices 110, 112. In another example, the computing device 600 can be utilized to process calculations, execute instructions, receive and transmit digital signals, receive and transmit search queries, and hypertext, as required by the device management server 106, the share point server 108, the update service 102, and the telephonic devices 112, 110.

The computing device 600 can be any general or special purpose computer now known or to become known capable of performing the steps and/or performing the functions described herein, either in software, hardware, firmware, or a combination thereof.

In its most basic configuration, computing device 600 typically includes at least one central processing unit (CPU) 602 and memory 604. Depending on the exact configuration and type of computing device, memory 604 may be volatile (such as RAM), non-volatile (such as ROM, flash memory, etc.) or some combination of the two. Additionally, computing device 600 may also have additional features/functionality. For example, computing device 600 may include multiple CPU's. The described methods may be executed in any manner by any processing unit in computing device 600. For example, the described process may be executed by both multiple CPU's in parallel.

Computing device 600 may also include additional storage (removable and/or non-removable) including, but not limited to, magnetic or optical disks or tape. Such additional storage is illustrated in FIG. 6 by storage 206. Computer storage media includes volatile and nonvolatile, removable and non-removable media implemented in any method or technology for storage of information such as computer readable instructions, data structures, program modules or other data. Memory 604 and storage 606 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 600. Any such computer storage media may be part of computing device 600.

Computing device 600 may also contain communications device(s) 612 that allow the device to communicate with other devices. Communications device(s) 612 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 600 may also have input device(s) 610 such as keyboard, mouse, pen, voice input device, touch input device, etc. Output device(s) 608 such as a display, speakers, printer, etc. may also be included. All these devices are well known in the art and need not be discussed at length.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method, comprising:
sending a self-provisioning request from an enterprise telephonic device to a device management server in an enterprise network, the self-provisioning request including a domain name system lookup request and a request to register as an element of the enterprise network;

receiving from the enterprise telephonic device an enterprise network address that permits the enterprise telephonic device to communicate with the device management server;

establishing a voice data link with the enterprise telephonic device so as to permit the enterprise telephonic device to communicate over a data network with at least one endpoint telephonic device; and transmitting heartbeat data from the enterprise telephonic device to the device management server, the heartbeat data indicative of a status of the enterprise telephonic device, including a voice communication function.

2. The method of claim 1, further comprising sending a diagnostic log if requested by the device management server.

3. The method of claim 1, further comprising sending a diagnostic log from the enterprise telephonic device.

4. The method of claim 1, wherein the domain name system lookup request includes a service record that requests authentication by the device management server.

5. The method of claim 1, wherein establishing the voice data link with the enterprise telephonic device includes receiving a dynamically provisioned IP address corresponding to the enterprise telephonic device.

6. The method of claim 1, further comprising querying an update software database to determine if there are any software updates available.

7. The method of claim 1, further comprising sending diagnostic data in the diagnostic log from the enterprise telephonic device, the device management server to filter the diagnostic data and provide the filtered diagnostic data to an update service for determination as to whether software updates are necessary or available.

8. The method of claim 1, further comprising:
sending, to the device maintenance server, event data associated with an occurrence of an event, the device maintenance server to analyze the heartbeat data and the event data to determine whether there is a voice communication malfunction in the enterprise telephonic device; and
if it is determined that there is a voice communication malfunction in the enterprise telephonic device, sending from the enterprise telephonic device a diagnostic log indicative of the occurrence of the event.

9. The method of claim 8, further comprising filtering diagnostic data in the diagnostic log from the enterprise telephonic device, the filtered diagnostic data to be provided to an update service for determination as to whether software updates are necessary or available.

10. The method of claim 8, further comprising receiving software updates to the enterprise telephonic device if there is a voice communication malfunction in the enterprise telephonic device.

11. The method of claim 8, further comprising checking an update software database to determine whether there are software updates available.

12. An apparatus comprising:
a processing unit;
a communication device;
a memory containing instructions, that when executed by the processing unit, cause the apparatus to:
send a self-provisioning request, to an device management server in an enterprise network via the communication device, from an enterprise telephonic device, wherein the enterprise network does not have previous data associated with the enterprise telephonic device, the self-provisioning request including a domain name system lookup request and a request to register as an element of the enterprise network;
receive an enterprise network address to permit the enterprise telephonic device to communicate with the device management server;
establish a voice data link to permit the enterprise telephonic device to communicate over a data network with endpoint telephonic devices; and
transmit to the device management server heartbeat data from the enterprise telephonic device, the heartbeat data being indicative of a status of at least one operation of the enterprise telephonic device, including a voice communication function.

13. The apparatus of claim 12, the memory further comprising instructions that when executed by the processing unit, cause the apparatus to:
send a request to the device management server to determine whether a software update is available, the device management server to request, from an update service that is separate from the device management server, an indication of whether an update service software is available for downloading; and
receive, at the enterprise telephonic device, an indication that a software update is available when the enterprise telephonic device has not previously received the update service software and when the update service provides the indication to the device management service that update service software is available.

14. The apparatus of claim 12, wherein the device management service to request the update service software from the update service when the update service provides the indication to the device management service that update service software is available.

15. The apparatus of claim 12, wherein the device management service to provide the enterprise telephonic device with the update service software from the update service when the update service provides the indication to the device management service that update service software is available.

16. The apparatus of claim 12, wherein the update service software is stored in an update software database.

17. The apparatus of claim 12, the memory further comprising instructions that when executed by the processing unit, cause the apparatus to:
send, to the device maintenance server, event data corresponding to the enterprise telephonic device and associated with an occurrence of an event, the event data and the heartbeat data being analyzed, at the device maintenance server, to determine whether there is a voice communication malfunction in the enterprise telephonic device; and
send, to the device maintenance server, a diagnostic log indicative of the occurrence of the event when it is determined that there is a voice communication malfunction in the enterprise telephonic device.

18. The apparatus of claim 17, the memory further comprising instructions that when executed by the processing unit, cause the apparatus to:
store, at a share point server, at least one of the diagnostic log and the update service software.

19. The apparatus of claim 17, wherein at least one of the update service software and the diagnostic log being communicated from the share point server to the device maintenance server.

20. An enterprise network, comprising:
a plurality of enterprise telephonic devices of each is operative to submit a self-provisioning request to a device management server to automatically register as an element of the enterprise network, wherein the enterprise network does not have previous data associated with the enterprise telephonic device and the self-provisioning request includes a domain name system lookup request; and an enterprise telephone device of the plurality of enterprise telephonic devices operative to receive an enterprise network address permitting communication with the device management server, establish a voice data link to permit the enterprise telephonic device to communicate over a data network with endpoint telephonic devices, and transmit heartbeat data from the enterprise telephonic device to the device management server, the heartbeat data being indicative of a status of the enterprise telephonic device, including a voice communication function.

\* \* \* \* \*